US010291442B2

(12) United States Patent
Mendel et al.

(10) Patent No.: US 10,291,442 B2
(45) Date of Patent: *May 14, 2019

(54) LOW-SKEW CHANNEL BONDING USING PHASE-MEASURING FIFO BUFFER

(71) Applicant: ALTERA CORPORATION, San Jose, CA (US)

(72) Inventors: David W. Mendel, Sunnyvale, CA (US); Han Hua Leong, San Jose, CA (US)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/684,310

(22) Filed: Aug. 23, 2017

(65) Prior Publication Data

US 2017/0353335 A1 Dec. 7, 2017

Related U.S. Application Data

(63) Continuation of application No. 14/676,583, filed on Apr. 1, 2015, now Pat. No. 9,774,478.

(51) Int. Cl.
*H04L 25/14* (2006.01)
*H04L 12/24* (2006.01)
(Continued)

(52) U.S. Cl.
CPC ............ *H04L 25/14* (2013.01); *G06F 5/06* (2013.01); *H04L 41/0896* (2013.01); *H04L 43/087* (2013.01); *H04L 47/56* (2013.01)

(58) Field of Classification Search
CPC ... H04L 41/0896; H04L 43/087; H04L 47/56; H04L 12/875; H04J 3/02
See application file for complete search history.

(56) References Cited

U.S. PATENT DOCUMENTS 6,985,096 B1 * 1/2006 Sasaki ................. H03K 5/135
341/100
7,292,080 B2 11/2007 Minzoni
(Continued)

OTHER PUBLICATIONS

IEEE Standard for a Precision Clock Synchronization Protocol for Networked Measurement and Control Systems, Jul. 24, 2008, 289 pages, IEEE Std 1588-2008 (Revision of IEEE Std 1588-2002).
(Continued)

*Primary Examiner* — Edan Orgad
*Assistant Examiner* — Nourali Mansoury
(74) *Attorney, Agent, or Firm* — Compass IP Law PC

(57) ABSTRACT

Circuits and methods are disclosed for low-skew bonding of a plurality of data channels into a multi-lane data channel. In one embodiment, phase-measuring first-in first-out buffer circuits buffer pre-buffer parallel data signals and generate phase-measurement signals. A channel-bonding control circuit receives the phase-measurement signals and generates bit-slip control signals. Transmission bit-slip circuits slip integer numbers of bits based on the bit-slip control signals. Bypass registers may be used when the integer number of bits is greater or equal to the parallel width of a lane. In another embodiment, the channel-bonding control circuit receives the phase-measurement signals from the phase-measuring FIFO buffer circuits and generates clock-slip control signals. Clock slip circuits controllably slip parallel clock signals by integer numbers of unit intervals of a serial clock signal. Various other aspects, features, and embodiments are also disclosed.

19 Claims, 13 Drawing Sheets

(51) Int. Cl.
  *H04L 12/26* (2006.01)
  *H04L 12/875* (2013.01)
  *G06F 5/06* (2006.01)

(56) References Cited

U.S. PATENT DOCUMENTS

| | | |
|---|---|---|
| 8,238,452 B1 | 8/2012 | Sarmah |
| 8,812,893 B1 | 8/2014 | Venkata et al. |
| 9,042,404 B2 | 5/2015 | Duwel et al. |
| 2001/0021203 A1 | 9/2001 | Takizawa et al. |
| 2004/0258185 A1* | 12/2004 | Kihara ............... H04B 1/1027 375/371 |
| 2005/0193290 A1* | 9/2005 | Cho ............... G01R 31/31709 714/710 |
| 2008/0181258 A1 | 7/2008 | Tomizawa |

OTHER PUBLICATIONS

Pedro Moreira, et al. "White Rabbit: Sub-Nanosecond Timing Distribution over Ethernet", Oct. 12-16, 2009, pp. 58-62, ISPCS 2009 International IEEE Symposium on Precision Clock Syncronization for Measurement, Control and Communication, Brescia, Italy.
Altera—CPRI MegaCore Function User Guide, Jun. 2012, 11 pages, Altera Corporation, San Jose, CA.
IEEE std. 802.3ba-2010 (Amendment to IEEEStd 802.3-2008), Amendment 4: Media Access Control Parameters, Physical Layers, and Management Parameters for 40 Gb/s and 100 Gb/s Operation, Jun. 22, 2010, 457 pgs.
M Gustlin, P Anslow, and D Giannakopoulos, 100GE/40GE skew budget, Nov. 2008, 21 pgs., IEEE 802.3ba TF.
Gary Nicholl, 100GE and 40GE PCS Overview, Nov. 2008, 27 pgs., IEEE 802.3az Energy Efficient Ethernet Task Force public area.

\* cited by examiner

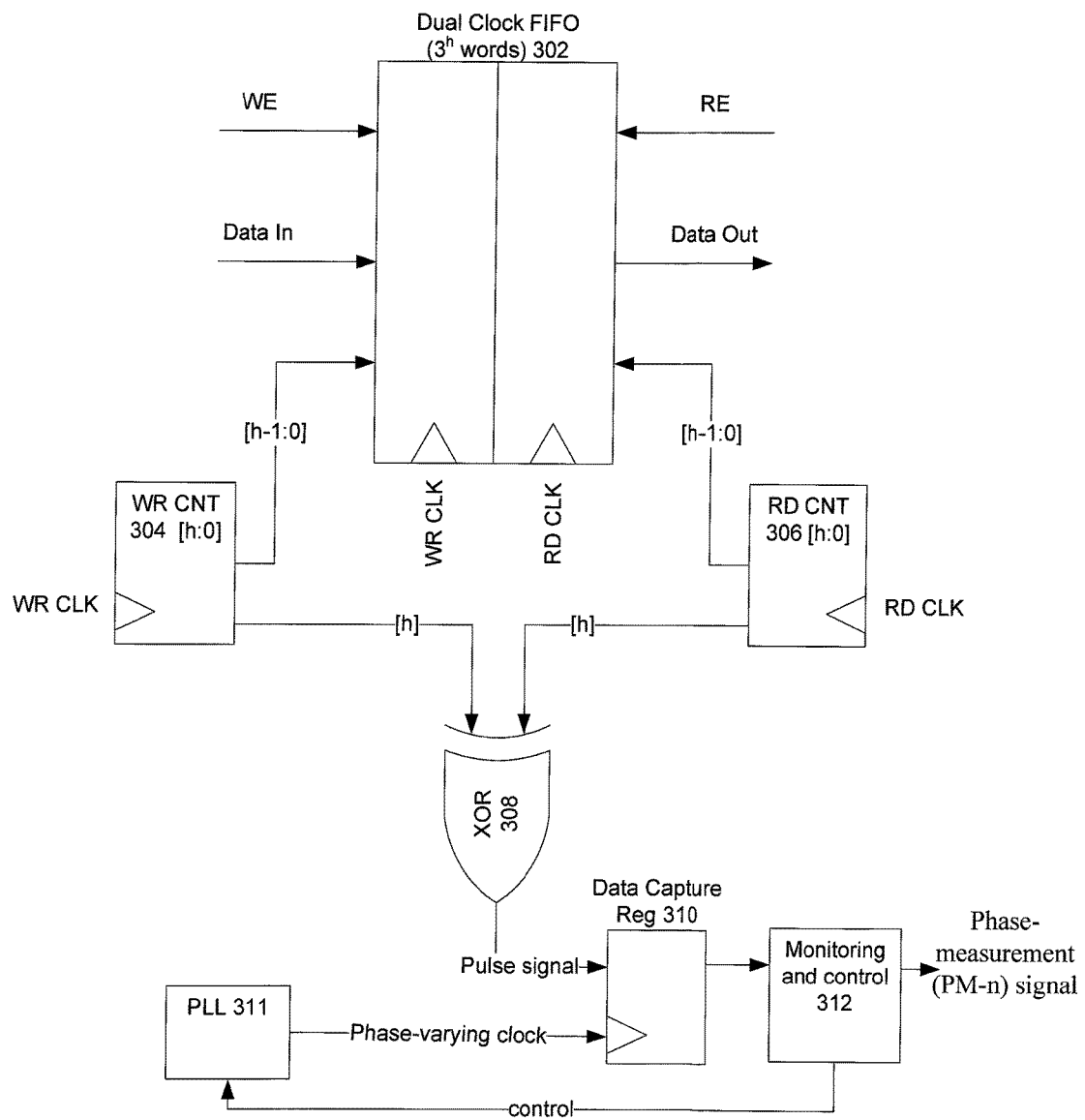
FIG. 3    300

LOW-SKEW CHANNEL BONDING USING PHASE-MEASURING FIFO BUFFER

CROSS-REFERENCE TO RELATED APPLICATION(S)

The present application is a continuation of U.S. patent application Ser. No. 14/676,583, filed Apr. 1, 2015, entitled "Low-Skew Channel Bonding Using Phase-Measuring FIFO Buffer," the disclosure of which is hereby incorporated by reference.

BACKGROUND

Technical Field

The present invention relates generally to data communication circuits, including serial interface circuits.

Description of the Background Art

High speed serial interface (HSSI) bonding is required for many protocols that require low channel-to-channel skew. Such protocols typically limit skew to a few unit intervals (UI) or less between transmission pins on an integrated circuit.

Implementing HSSI bonding with low skew becomes more challenging at higher data rates. One reason is that conventional techniques for HSSI bonding tend to introduce additional jitter.

SUMMARY

Disclosed are circuits and methods for low-skew bonding of a plurality of data channels into a multi-lane data channel.

In one embodiment, phase-measuring first-in first-out (FIFO) buffer circuits buffer pre-buffer parallel data signals and generate phase-measurement signals. A channel-bonding control circuit receives the phase-measurement signals and generates bit-slip control signals. Transmission bit-slip circuits slip integer numbers of bits based on the bit-slip control signals. Bypass registers may be used when the integer number of bits is greater or equal to the parallel width of a lane.

In another embodiment, the channel-bonding control circuit receives the phase-measurement signals from the phase-measuring FIFO buffer circuits and generates clock-slip control signals. Clock slip circuits controllably slip parallel clock signals by integer numbers of unit intervals of a serial clock signal. The integer numbers of unit intervals are determined from the plurality of clock-slip control signals.

Various other aspects, features, and embodiments are also disclosed.

BRIEF DESCRIPTION OF THE DRAWINGS

FIG. 3 is a diagram of a first exemplary phase-measuring FIFO buffer circuit that may be used in the circuit apparatus of FIG. 1 in accordance with an embodiment of the invention.

DETAILED DESCRIPTION

Previous techniques to address channel-to-channel transmission skew focus on making adjustments using analog circuitry in the physical media attachment (PMA) or serializer circuits. For example, such previous techniques may make adjustments to reduce skew using distributed clocks, distributed resets, and alignment of phase-locked loops (PLLs).

The present disclosure provides methods and apparatus which achieve low-skew channel bonding using a phase-measuring first-in-first-out (FIFO) buffer. Adjustments are made using bit-slips at the transmitter.

Advantageously, the presently-disclosed technique does not add jitter and scales well to higher frequencies. The presently-disclosed technique also supports bonding across non-adjacent channels. The channels being bonded may be on a same integrated circuit device, or on different integrated circuit devices.

Figure 1:
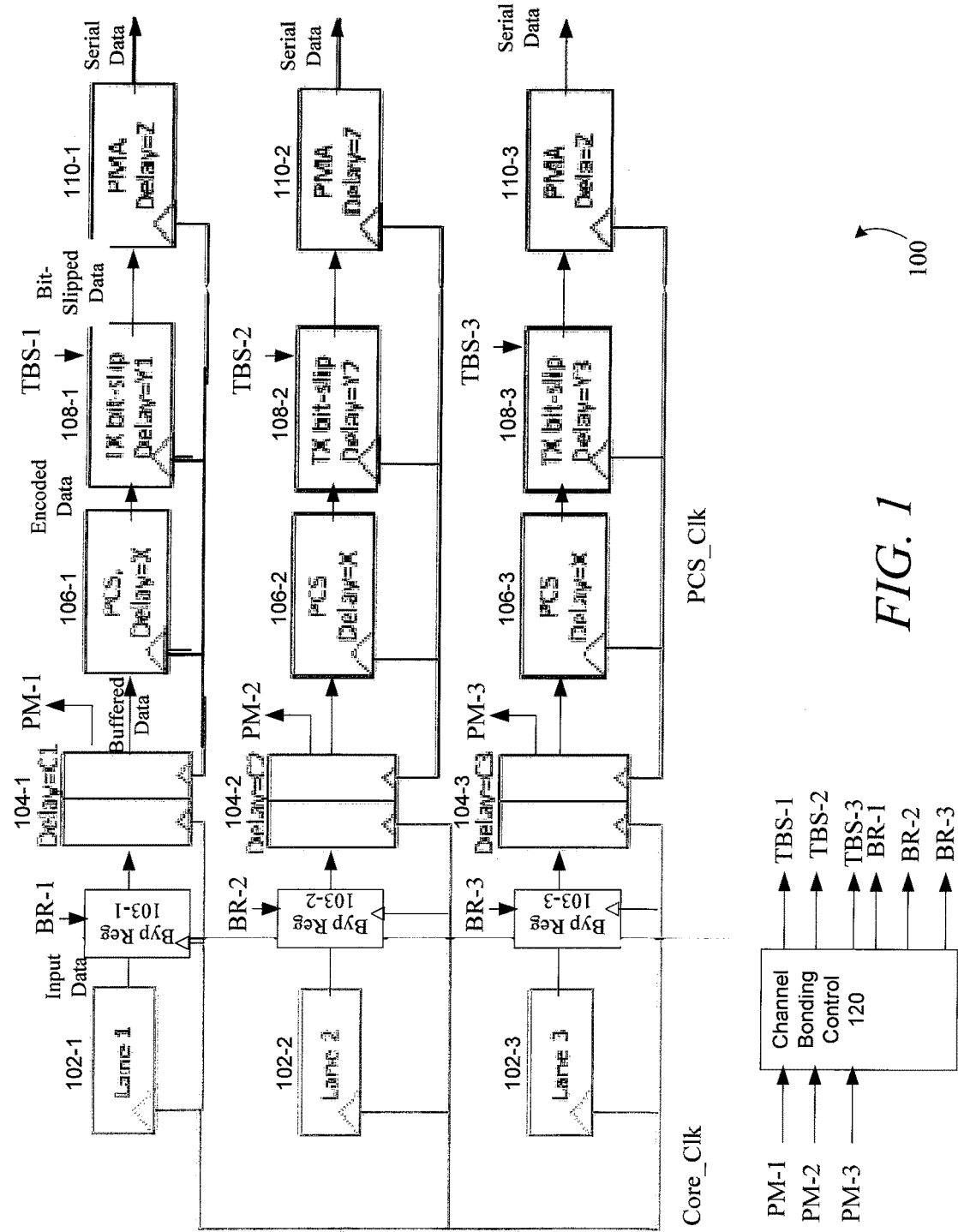
FIG. 1 is a schematic diagram of a circuit apparatus for low-skew channel bonding in accordance with an embodiment of the present invention.

FIG. 1 is a schematic diagram of a circuit apparatus 100 for low-skew channel bonding in accordance with an embodiment of the present invention. The circuit apparatus may be formed in an integrated circuit (IC) with a high-speed serial interface. In a particular implementation, the integrated circuit may be a field programmable gate array (FPGA).

In the illustrated example, three serial communication lanes (n=1 to 3) that may be bonded together are depicted.

However, the technique may be utilized to bond together any number (two or more) of serial communication lanes. In other words, the channel number n may range from 1 to N, where N is an integer that is two or higher. For example, two serial lanes may be bonded, three serial lanes may be bonded, four serial lanes may be bonded, or five serial lanes may be bonded, or six serial lanes may be bonded, and so on. Note that while the figure depicts the channels being bonded as adjacent, the channels being bonded may also be non-adjacent, or even on different integrated circuit devices.

As shown, the circuit apparatus 100 includes, for each serial channel n that may be bonded, a core register 102-$n$, a bypass register 103-$n$, a phase-measuring FIFO buffer circuit 104-$n$, a Physical Coding Sublayer (PCS) circuit (also referred to herein as an "encoder" circuit) 106-$n$, a transmitter (TX) bit-slip delay circuit 108-$n$, and PMA circuit (also referred to herein as a "serializer" circuit) 110-$n$. Two clock domains (Core_Clk and PCS_Clk) are depicted. In this embodiment, the Core_Clk clock signal is provided to the core registers 102-$n$, the bypass registers 103-$n$, and the phase-measuring FIFO buffers 104-$n$, and the PCS_Clk clock signal is provided to the phase-measuring FIFO buffers 104-$n$, the PCS circuits 106-$n$, the TX bit-slip delay circuits 108-$n$, and the PMA circuits 110-$n$.

As depicted, a core register (Lane n) 102-$n$ in the core circuitry for each lane n provides input data for transmission via the PCS and PMA circuitry for that lane. The input data may be a byte stream at a timing controlled by a first clock signal (Core_Clk) which may be from the core of the integrated circuit.

The input data for transmission via lane n is provided to the corresponding bypass register circuit 103-$n$ and then to the corresponding phase-measuring FIFO buffer circuit 104-$n$. The bypass register circuit 103-$n$ may be implemented with one (or more) bypassable register to provide a controllable delay of one (or more) parallel clock cycle, or it may be controllably bypassed so as to not provide such a delay.

As depicted, Core_Clk provides timing for a write section of each phase-measuring FIFO buffer circuit 104-$n$. In other words, Core_Clk is the write clock for each of the phase-measuring FIFO buffer circuits 104-$n$ (n=1, 2, . . . , N).

As further depicted, a second clock signal (PCS_Clk) is used by the physical coding sublayer (PCS) circuits 106-$n$. The PCS_Clk signal also provides timing for the read section of each phase-measuring FIFO buffer circuit 104-$n$. In other words, PCS_Clk is the read clock for each of the phase-measuring FIFO buffer circuits 104-$n$ (n=1, 2, . . . , N). In addition, the PCS_Clk signal also provides a clock for the transmission (TX) bit-slip circuits 108-$n$ and the physical media attachment (PMA) circuits 110-$n$.

Exemplary implementations of a phase-measuring FIFO buffer circuit 104-$n$ are described below in relation to FIGS. 3 to 7. A first exemplary implementation is described below in relation to FIGS. 3, 4 and 5. A second exemplary implementation is described below in relation to FIGS. 6 and 7. In these implementations, the phase-measuring FIFO buffer circuit for each channel may utilize a dual clock FIFO circuit that receives a write clock (for example, Core_Clk in FIG. 1) at its write clock input and a read clock (for example, PCS_Clk in FIG. 1) at its read clock input. The phase-measuring FIFO buffer circuit 104-$n$ is not intended to be limited to just these exemplary implementations. Other implementations for the phase-measuring FIFO buffer circuit 104-$n$ may be used. For example, an alternate circuit implementation may be arranged so as to, on a regular basis, subtract the read and write pointers (having used a grey code to cross clock domains) and then average the various measurements.

As shown in FIG. 1, the TX bit-slip delay circuit 108-$n$ for each channel n may be positioned between the PCS circuitry 106-$n$ and the PMA circuitry 110-$n$. The TX bit-slip delay circuit 108-$n$ is adjustable so as to delay the data signal provided from the PCS circuit 106-$n$ to the PMA circuit 110-$n$ by a controllable number of bits (i.e. by a controllable number of unit intervals). In an exemplary implementation, each TX bit-slip circuit 108-$n$ may be implemented using a barrel shifter circuit.

In a first embodiment, each TX bit-slip delay circuit 108-$n$ may have a granularity of slipping of one bit. In a second embodiment, each TX bit-slip delay circuit 108-$n$ may have a granularity of slipping of two bits. In a third embodiment, each TX bit-slip delay circuit 108-$n$ may have a granularity of slipping of four bits. In a fourth embodiment, each TX bit-slip delay circuit 108-$n$ may have a granularity of slipping of eight bits. More generally, each TX bit-slip delay circuit 108-$n$ may have a granularity of one or more bits.

The granularity of the bit slipping may be selected to satisfy the accuracy (in terms of low skew) of a bonding requirement of a communications protocol. For example, in one hypothetical implementation, the data rate for the serial output from the PMA circuit may be 25 Gigabits per second (Gbps) and the maximum skew allowable may be 500 picoseconds. In that case, the maximum skew allowable of 500 picoseconds corresponds to 25 Gbps×500 picoseconds=12.5 unit intervals (UIs). In this case, the bit slip granularity of 8 bits, for example, may be sufficient, since 8 is less than 12.5. Further margin of safety may be obtained at a lower bit slip granularity (for example, a granularity of 4 bits).

Each TX bit-slip delay circuit 108-$n$ of the second embodiment (with 2-bit granularity) provides less accurate (by factor of 2) bonding than the first embodiment (with 1-bit granularity), but it may be implemented (for example, using a barrel shifter circuit) with approximately half the circuit area. Similarly, each TX bit-slip delay circuit 108-$n$ of the third embodiment (with 4-bit granularity) provides less accurate (by factor of 2) bonding than the second embodiment (with 2-bit granularity), but it may be implemented (for example, using a barrel shifter circuit) with approximately half the circuit area. Similarly, each TX bit-slip delay circuit 108-$n$ of the fourth embodiment (with 8-bit granularity) provides less accurate (by factor of 2) bonding than the third embodiment (with 4-bit granularity), but it may be implemented (for example, using a barrel shifter circuit) with approximately half the circuit area.

In accordance with an embodiment of the invention, the TX bit-slip delay circuits 108-$n$ (n=1, 2, . . . , N) are advantageously used in conjunction with the phase-measuring FIFO buffer circuits 104-$n$ (n=1, 2, . . . , N) to provide low-skew bonding of the multiple channels. The phase delays through the phase-measuring FIFO buffer circuits 104-$n$ are measured individually. Each phase-measuring FIFO buffer circuit 104-$n$ generates a phase-measurement (PM-n, n=1, 2, . . . , N) signal and provides the PM-n signal to a channel bonding control circuit 120.

The channel bonding control circuit 120 utilizes the N PM-n signals to generate TX bit-slip (TBS-n, n=1, 2, . . . , N) control signals and the bypass register (BR-n, n=1, 2, . . . , N) control signals. The TBS-n control signals adjust the bit-slip delays for the corresponding TX bit-slip delay circuits 108-$n$. The BR-n control signals adjust the parallel-clock delays provided by the corresponding bypass register circuits 103-n. Advantageously, the transmission bit-slips may be adjusted so as to make the delays through the FIFO plus the TX bit-slip the same across all bonded lanes. More generally, the transmission bit-slips are adjusted so as to equalize across all bonded lanes the total propagation delay from the data leaving the core circuit 102-n through the data leaving the PMA circuit 110-n.

Figure 2A:
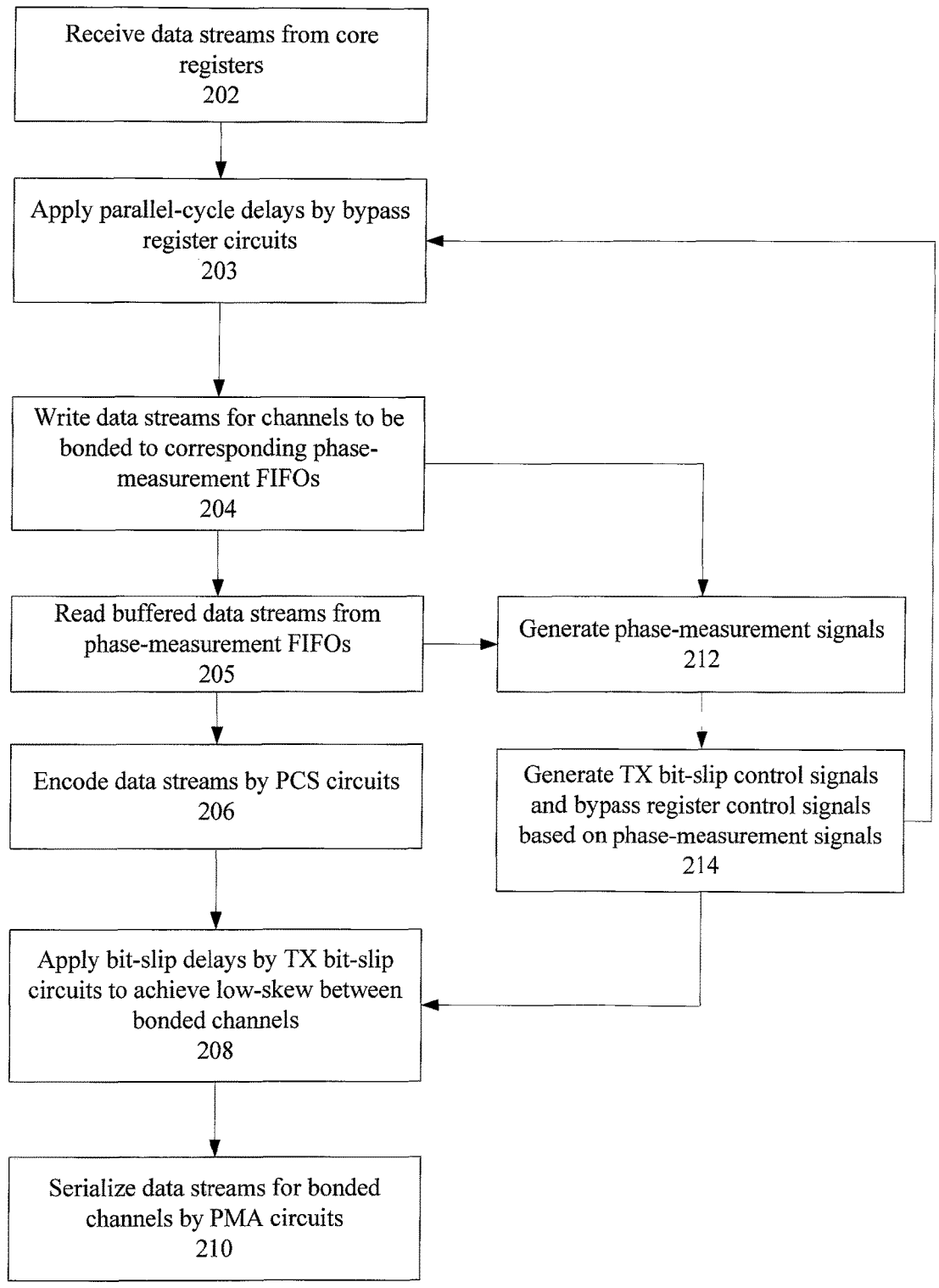
FIG. 2A is a flow chart of a method of low-skew channel bonding in accordance with an embodiment of the invention.

FIG. 2A is a flow chart of an exemplary method 200 of low-skew channel bonding in accordance with an embodiment of the invention. The method 200 may be performed, for example, using the exemplary circuit apparatus 100 discussed above in relation to FIG. 1.

Per step 202, data streams for the channels to be bonded may be received from the corresponding core register circuits 102-n. One word (lane width) of bits may be output from each core register circuit 102-n during each core clock cycle (Core_Clk).

Per step 203, delays of one (or more) parallel cycles may be applied in a controllable manner by corresponding bypass register circuits. In the exemplary circuit apparatus 100 of FIG. 1, the bypass register control signals BR-n (n=1, 2, ..., N) from the channel bonding control circuit 120 provide the control signals to the corresponding bypass register (Byp Reg) circuits 103-n (n=1, 2, ..., N) to control individually (per lane) the application of the parallel cycle delays.

Alternatively, instead of using a bypass register circuit to implement slippage by a word, the read or write enable signal may be pulsed to make the FIFO either more or less shallow by a word. In other words, the read or write enable signal for a lane may be pulsed to effectively adjust the FIFO depth for that lane to delay the lane by a parallel cycle. Such alternate embodiments are described below in relation to FIGS. 10A and 10B.

Per step 204, data streams for the channels to be bonded may be written to the corresponding phase-measuring FIFO buffers. In the exemplary circuit apparatus 100 of FIG. 1, the data streams for the N channels that are to be bonded may be written to the phase-measuring FIFO buffer circuits (104-1, 104-2, ..., 104-N).

Per step 205, buffered data streams may be read from the phase-measuring FIFO buffers. In the exemplary circuit apparatus 100 of FIG. 1, the PCS circuits (106-1, 106-2, ..., 106-N) for the N channels may read the buffered data streams from the corresponding phase-measuring FIFO buffer circuits (104-1, 104-2, ..., 104-N).

Per step 206, encoding may be applied to the buffered data streams. In the exemplary circuit apparatus 100 of FIG. 1, the PCS circuits (106-1, 106-2, ..., 106-N) for the N channels encodes the buffered data streams. The encoding applied by the PCS circuits may provide physical coding sublayer functions, including providing data transitions for clock recovery (for example, by 64 bit to 66 bit encoding), frame delineation, and lane striping of data for the multiple-channel bonding.

Per step 208, bit-slip delays may be applied to the encoded data streams. In the exemplary circuit apparatus 100 of FIG. 1, the TX bit-slip TBS-n (n=1, 2, ..., N) control signals from the channel bonding control circuit 120 provide the control signals to the corresponding TX bit-slip delay circuits (108-1, 108-2, ..., 108-N) to control individually (per lane) the application of the bit-slip delays to the corresponding encoded data streams from the PCS circuits (106-1, 106-2, ..., 106-N).

Per step 210, the bit-slipped data streams may be serialized. In the exemplary circuit apparatus 100 of FIG. 1, the PMA circuits (110-1, 110-2, ..., 110-N) for the N channels serialize the corresponding bit-slipped data streams from the TX bit-slip delay circuits (108-1, 108-2, ..., 108-N).

In addition, per step 212, phase-measurement signals may be generated by the phase-measuring FIFO buffers. In the exemplary circuit apparatus 100 of FIG. 1, the phase-measurement PM-n (n=1, 2, ..., N) signals are generated by the phase-measuring FIFOs 104-n (n=1, 2, ..., N) and provided to the channel bonding control circuit 120.

Per step 214, the TX bit-slip and bypass register control signals are generated based on the phase-measurement signals. An exemplary method of generating bit-slip delay and parallel-cycle delay control signals for multiple lanes being bonded is described below in relation to FIG. 2B.

The result of the method 200 in FIG. 2A is to bond the multiple channels with low skew between lanes so as to obtain a multi-lane connection. In order to achieve low skew between lanes, the bit-slip delays and the parallel-cycle delays are adjusted individually by TX bit-slip control signals and the bypass register control signals, respectively, so that the total propagation delay from the core register to the output of the PMA circuit is the same across all lanes is the same across all lanes. In other words, if the data in the core is aligned on a common global clock, and the total delay from the core to the pins is equal, then the data is also aligned at the pins. Note that, if there are secondary effects such as core global clock tree skew and clock propagation delay differences across lanes, then these secondary effects may also be compensated by adjustment of the TX bit-slip control signals and the bypass register control signals.

For example, consider an implementation where it is a reasonable assumption that the delays from the PCS circuits (shown as Delay=X in FIG. 1) and the delays from the PMA circuits (shown as Delay=Z in FIG. 1) are the same across all lanes. In addition, consider that the phase-measurement signals indicate occupancy levels that correspond to varying delays $C_n$ (n=1, 2, ..., N) for the N lanes. In this case, the TX bit-slip control signals (TBS-n, n=1, 2, ..., N) and the bypass register control signals (BR-n, n=1, 2, ..., N) may be determined in order to add a combined delay $Y_n$ so that the total propagation delay from the core register 102-n to the output of the PMA circuit 110-n is the same across all lanes.

Hence, for lane n, the total propagation delay is given by $C_n+X+Y_n+Z$. Specifically: the total propagation delay for lane 1 is given by $C_1+X+Y_1+Z$; the total propagation delay for lane 2 is given by $C_2+X+Y_2+Z$; the total propagation delay for lane 3 is given by $C_3+X+Y_3+Z$; and so on. In accordance with an embodiment of the invention, the TBS-n and BR-n control signals are adjusted so that $C_1+Y_1=C_2+Y_2=C_3+Y_3=\ldots=C_N+Y_N$.

Figure 2B:
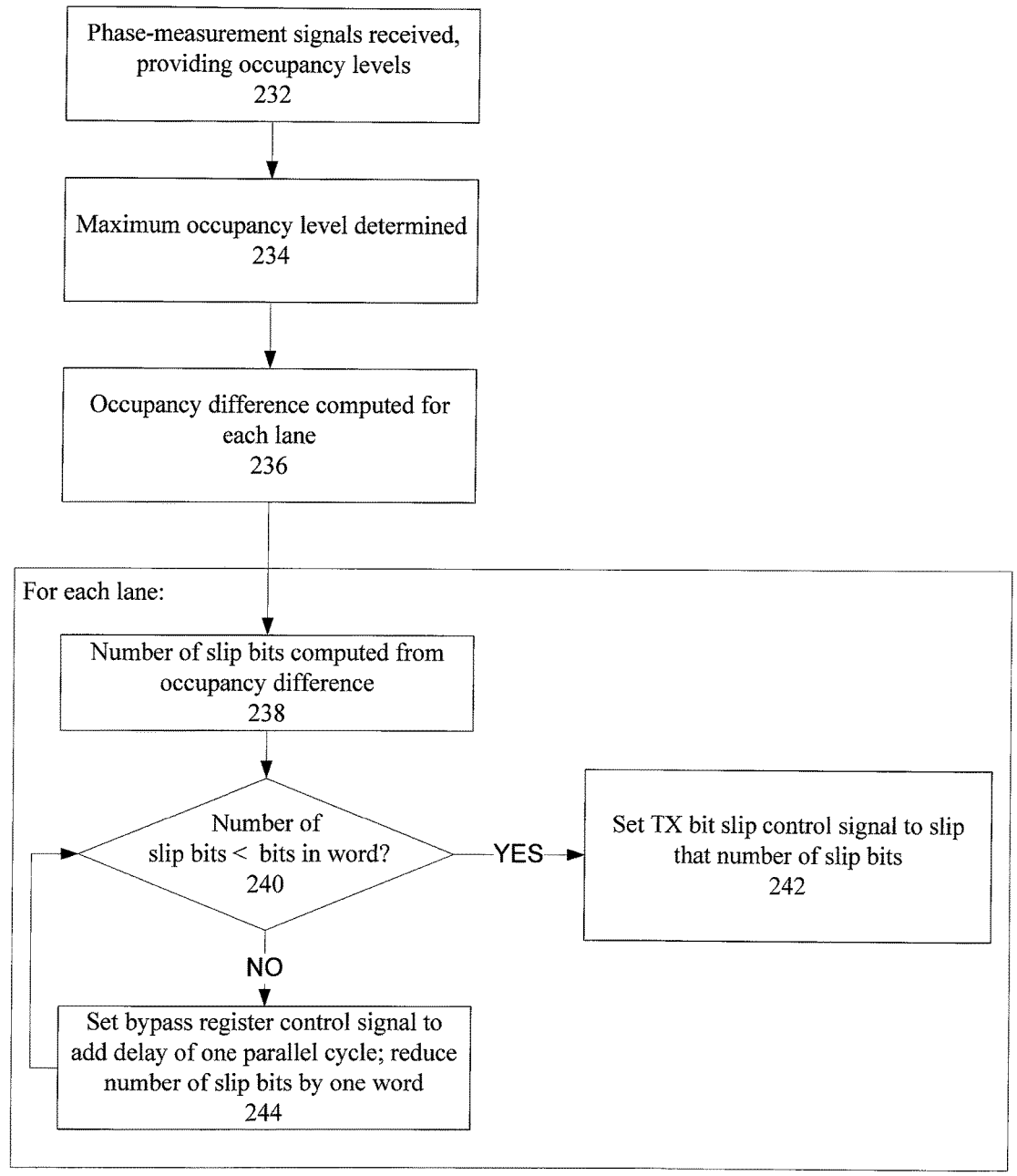
FIG. 2B is a flow chart of a method of determining bit-slip delay and parallel-cycle delay control signals for multiple lanes being bonded in accordance with an embodiment of the invention.

FIG. 2B is a flow chart of an exemplary method 230 of determining bit-slip delay control signals (TBS-n) and parallel-cycle delay control signals (BR-n) for multiple lanes being bonded in accordance with an embodiment of the invention. While the flow chart of FIG. 2B provides one specific method, other methods may be utilized.

Per step 232, the phase-measurement signals are received from the phase-measurement FIFO buffer circuits of the lanes to be bonded. In accordance with an exemplary implementation of the invention, each phase-measurement signal PM-n provides a measurement of the occupancy level of the corresponding phase-measurement FIFO 104-n. Each phase-measurement signal may provide an occupancy level of the corresponding FIFO.

Per step 234, a maximum occupancy level from the phase-measurement signals may be determined. The maximum occupancy level may be stored in a maximum occupancy register.

Per step 236, the difference between each occupancy level and the maximum occupancy level may be computed for each lane. The occupancy difference for each lane may be stored in corresponding occupancy difference registers.

Per step 238, for each lane, a number of bits to slip may be determined from the occupancy difference. The bits slips may be determined such that the total propagation delay from the core register to the output of the PMA is the same across all lanes.

A determination may be made, per step 240, as to whether or not the number of bits for a lane is less than the width in bits of the lane. If the number of bits to slip for the lane (lane n) is less than the width of the lane, then the TX bit-slip control signal (TBS-n) for that lane may be set, per step 242, so as to slip that number of bits. On the other hand, if the number of bits to slip for the lane is greater than or equal to the width in bits of the lane, then the bypass register control signal (BR-n) for that lane may be set (or the FIFO depth adjusted), per step 244, to add a parallel cycle delay and the number of bits to slip for that lane may then be reduced by one lane width (i.e. one word) of bits. After step 244, the method 230 may loop back to step 240.

First Embodiment of Phase-Measuring FIFO

A first embodiment of a phase-measuring FIFO buffer circuit 104-$n$ is the phase-measuring FIFO buffer circuit 300 depicted in FIG. 3. As shown, the buffer circuit 200 may include a dual-clock FIFO buffer 302, a write counter (WR CNT) 304, a read counter (RD CNT) 306, exclusive-or (XOR) logic circuit 308, data-capture register 310, phase-locked loop (PLL) 311, and monitoring and control logic 312.

The FIFO buffer 302 has a depth of $2^n$ data words, where n is a counting number. In other words, the depth of the FIFO buffer 302 may be 2 words, or 4 words, or 8 words, or 16 words, etc. The FIFO buffer 302 has a data in (DATA IN) port, a data out (DATA OUT) port, a write enable (WE) control input, a read enable (RE) control input, a write address (WR ADR) port, a read address (RD ADR) port, a write clock input (WR CLK), and a read clock input (RD CLK). The write and read enable control inputs allow data to be written or read, respectively, on only selective clock cycles. For example, data may be allowed to be written or read only on cycles with valid data in the "data valid" use case described below.

The write counter 304 has a length of h+1 bits: bit 0, bit 1, bit 2, . . . , bit h−1, and bit h. In other words, the length in bits of the write counter 104 is one plus the logarithm base 2 of the depth of the FIFO buffer. After each write of one word to the FIFO buffer 302, the write counter 304 is incremented by one to point to a next address of the FIFO buffer 302.

The lower-order h bits (i.e. bit h−1 through bit 0) of the read counter 304 are used for the write address (i.e. the FIFO address to which a word is to be written). The highest-order bit (i.e. bit h) of the write counter 304 is not needed for addressing. This is because the FIFO buffer 302 has a depth of $2^h$ words and so only needs the lower-order h bits to address. Nevertheless, in accordance with an embodiment of the invention, the highest-order bit of the write counter 304 is maintained. As described further below, the highest-order bit is output from the write counter 304 to a first input of the XOR logic circuit 308.

The read counter 306 also has a length of h+1 bits: bit 0, bit 1, bit 2, . . . , bit h−1, and bit h. In other words, the length in bits of the read counter 106 is one plus the logarithm base 2 of the depth of the FIFO buffer. After each read of one word from the FIFO buffer 302, the read counter 106 is incremented by one to point to a next address of the FIFO buffer 302.

The lower-order h bits (i.e. bit 0 through bit h−1) of the read counter 306 are used for the read address (i.e. the FIFO address from which a word is to be read). The highest-order bit (i.e. bit h) of the read counter 306 is not needed for addressing. This is because the FIFO buffer 302 has a depth of $2^h$ words and so only needs the lower-order h bits to address. Nevertheless, in accordance with an embodiment of the invention, the highest-order bit of the read counter 306 is maintained. As described further below, the highest-order bit is output from the read counter 306 to a second input of the XOR logic circuit 308.

The XOR logic circuit 308 receives the highest-order bits from the write counter 304 and the read counter 306 at its inputs. As shown, a pulse signal is output from the XOR logic circuit 308.

In the illustrated embodiment, the pulse signal may be received by a data-capture register (Data Capture Reg 310). The data-capture register 310 may read the pulse signal as data with a phase-varying clock, and a determination may be made as to whether the data capture register 310 captures a logical low signal or logical high signal.

In this embodiment, the duty cycle of the pulse signal may be determined by controllably varying the phase of the phase-varying clock signal (for example, over a predetermined range of phases) and monitoring the resultant data that is captured by the data-capture register 310. The variation of the phase may be accomplished by a control signal sent from the monitoring and control logic 312 to the PLL 311 that generates the phase-varying clock signal.

Because the duty cycle of the pulse signal is measured to indicate the occupancy of the FIFO buffer 302, the delay from each counter (304 and 306) to the XOR logic gate 108 should be delay matched or have a delay mismatch (i.e. a skew) that is known with high accuracy (for example, to an accuracy of 50 picoseconds to 100 picoseconds).

Figure 4:
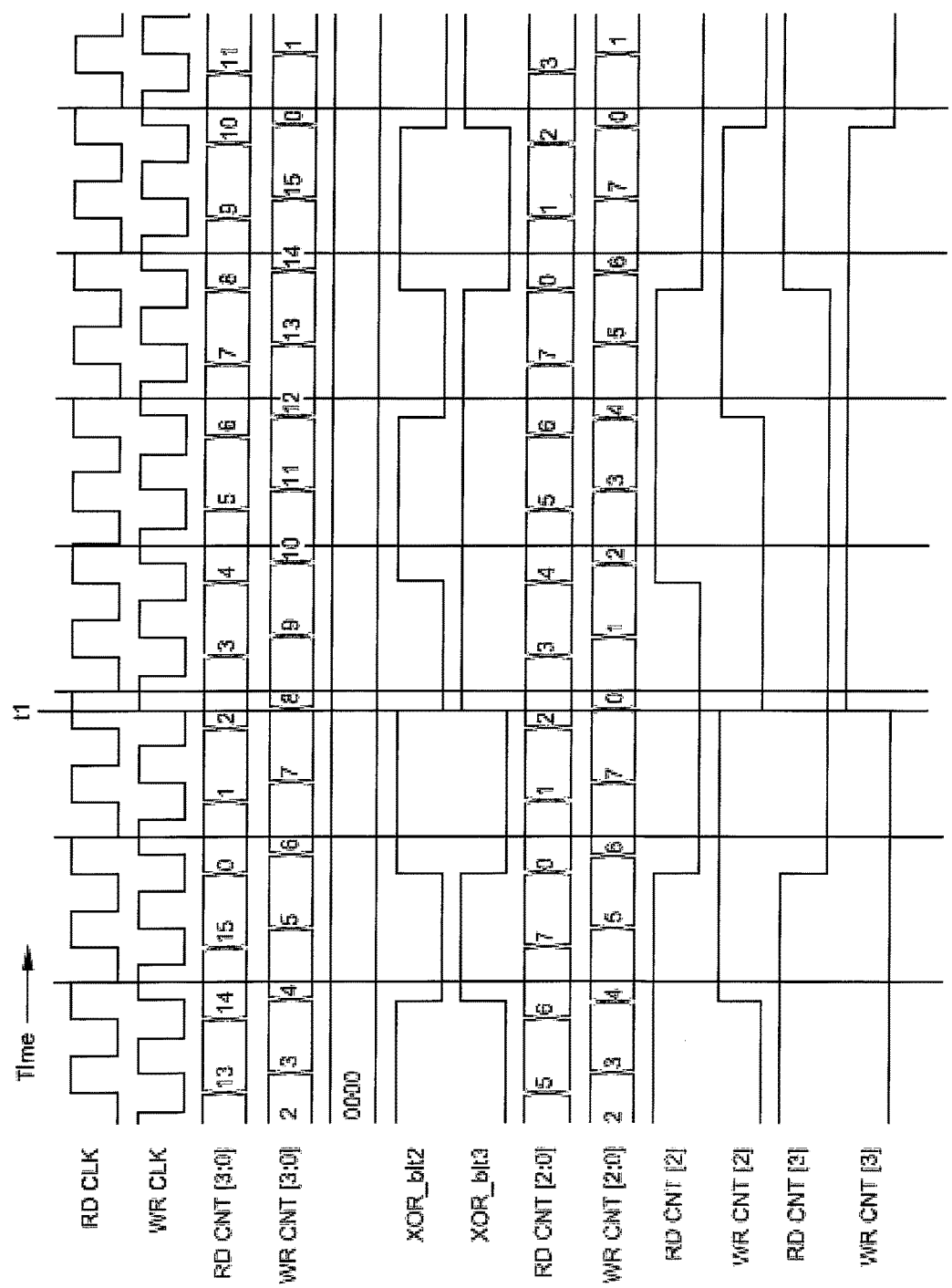
FIG. 4 is an example timing diagram for the first exemplary phase-measuring FIFO buffer circuit in accordance with an embodiment of the invention.

FIG. 4 is an example timing diagram for the exemplary circuit 200 of FIG. 2 in accordance with an embodiment of the invention. For this example, h=3 such that the depth of the FIFO buffer is $2^3$=8 words, and the lengths of the write and read counters are both 3+1=4.

The example signals and data shown include: the read clock (RD CLK) signal; the write clock (WR CLK) signal; the read counter (RD CNT); the write counter (WR CNT) value. Also shown are: the exclusive-or of bit 2 of the read and write counters (XOR bit 2); the exclusive-or of bit 3 of the read and write counters (XOR bit 3); the value of the lower order 3 bits of the read counter (RD CNT [2:0]); the value of the lower order 3 bits of the write counter (WR CNT [2:0]); bit 2 of the read counter (RD CNT[2]); bit 2 of the write counter (WR CNT[2]); bit 3 of the read counter (RD CNT[3]); and bit 3 of the write counter (WR CNT[3]).

As seen, RD CLK and WR CLK are out of phase with each other. In this example, the RD CNT is approximately 5.75 behind the WR CNT.

XOR bit 2 creates a pulse signal that has a cycle that is approximately four clock cycles long. The duty cycle of XOR bit 2 provides some information as to the occupancy level of the FIFO buffer. However, the duty cycle of the XOR bit 2 signal is unable to distinguish between a FIFO occupancy of X and a FIFO occupancy of 8−X. For example, a duty cycle of 2.25 out of 4 clock cycles for XOR bit 2 may indicate a FIFO occupancy of either 2.25 of 8 words or 5.75 of 8 words.

XOR bit 3 is a pulse signal that has a cycle that is approximately eight clock cycles long. As disclosed herein, the duty cycle of XOR bit 3 correctly indicates the occupancy level of the FIFO buffer. In the illustrated example, the duty cycle of XOR bit 3 is approximately 5.75 clock cycles of 8 clock cycles. This indicates unambiguously that the occupancy of the FIFO buffer is 5.75 words out of the maximum occupancy of 8 words.

In order to generate the XOR bit 3 signal, the read and write counters must have an additional bit beyond the bits needed to address the FIFO buffer. In this example, while RD CNT [2:0] and WR CNT [2:0] are sufficient to address the FIFO buffer, the read and write counters include bit 3 (an additional highest-order bit) for use in generating the XOR bit 3 signal.

Figure 5:
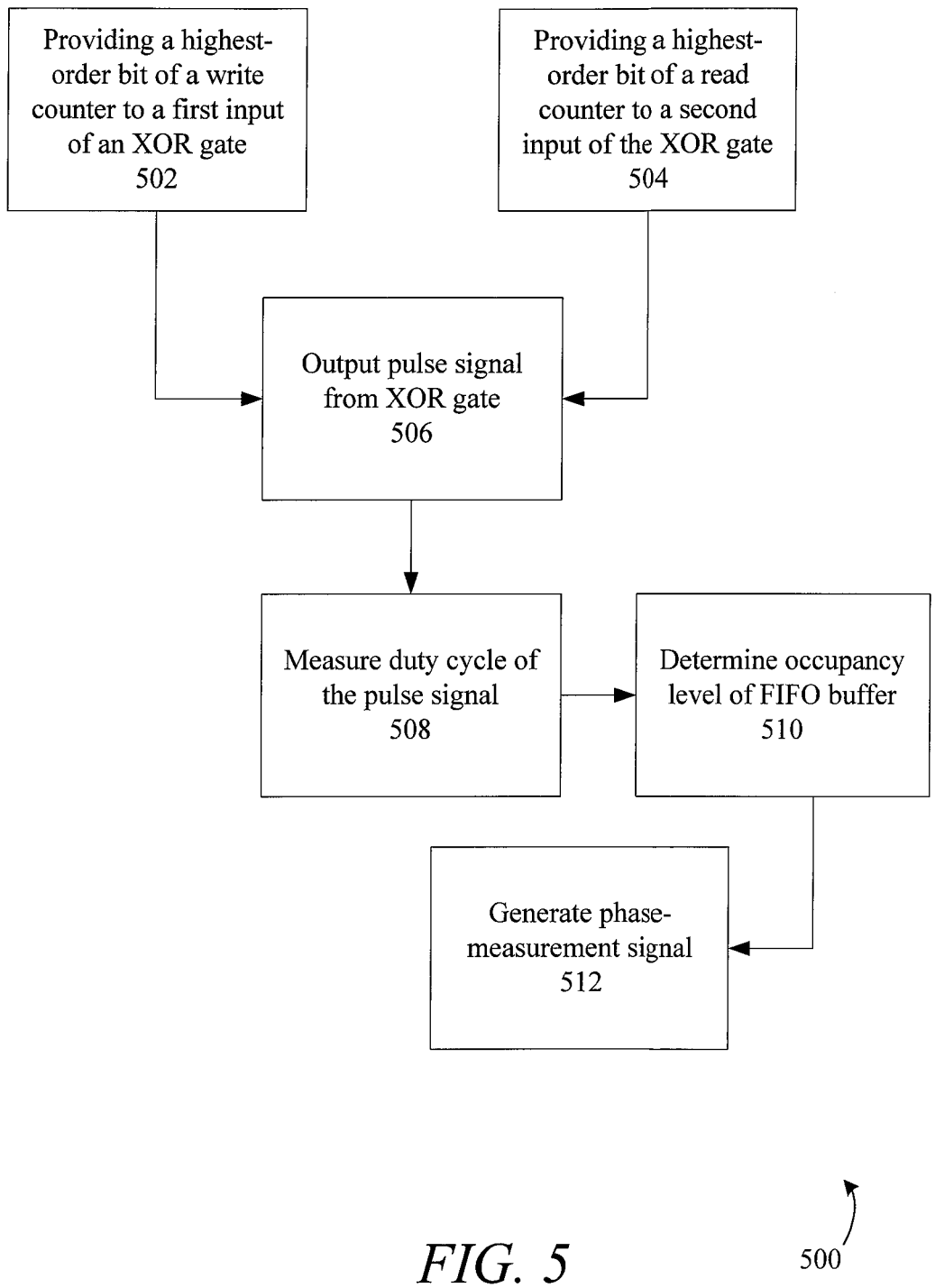
FIG. 5 is a flow chart of a method for measuring an occupancy level of a FIFO buffer using the first exemplary phase-measuring FIFO buffer circuit in accordance with an embodiment of the invention.

FIG. 5 is a flow chart of a method 500 for measuring an occupancy level of a FIFO buffer using the exemplary circuit of FIG. 2 in accordance with an embodiment of the invention. Per block 502, the highest-order bit is provided from a read counter to a first input of an exclusive-or logic gate. This bit may be referred to as the "highest-order read bit". Similarly, per block 504, the highest-order bit is provided from a write counter to a second input of the exclusive-or logic gate. This bit may be referred to as the "highest-order write bit". For example, if h=3 such that the FIFO buffer has a depth of 8 words, then the highest-order read bit from the read counter is RD CNT[3], and the highest-order write bit from the write counter is WR CNT[3].

Per block 506, a pulse signal is output from the exclusive-or logic gate. For example, if h=3 such that the FIFO buffer has a depth of 8 words, then the pulse signal is given by XOR (RD CNT[3], WR CNT[3]).

Per block 508, a duty cycle of the pulse signal is measured. In one implementation, the duty cycle of the pulse signal may be measured by sweeping a phase-varying clock signal across a range of phases under control of monitoring and control logic. Each phase step during the sweep may be a short interval, such as 100 picoseconds, for example. The phase-varying clock signal may be provided to a clock input of a data-capture register that receives the pulse signal at its data input. The data-capture register outputs a data signal to the monitoring and control logic, and the monitoring and control logic may then process the data signal to determine the duty cycle by finding the phase locations of the transitions in the pulse signal.

Per block 510, the duty cycle may be used by the monitoring and control logic to determine an occupancy level of the first-in-first-out buffer. For example, if the duty cycle is X clock cycles out of a maximum of 8 clock cycles, then the occupancy level may be determined to be X words out of a maximum depth of 8 words.

Finally, per block 512, the monitoring and control logic may generate a phase-measurement (PM) signal based on and indicative of the measured occupancy level. In an exemplary implementation, the phase-measurement signals PM-n from all the phase-measurement FIFO circuits 104-n are provided to the channel bonding control circuit 120.

Second Embodiment of Phase-Measuring FIFO

Figure 6:
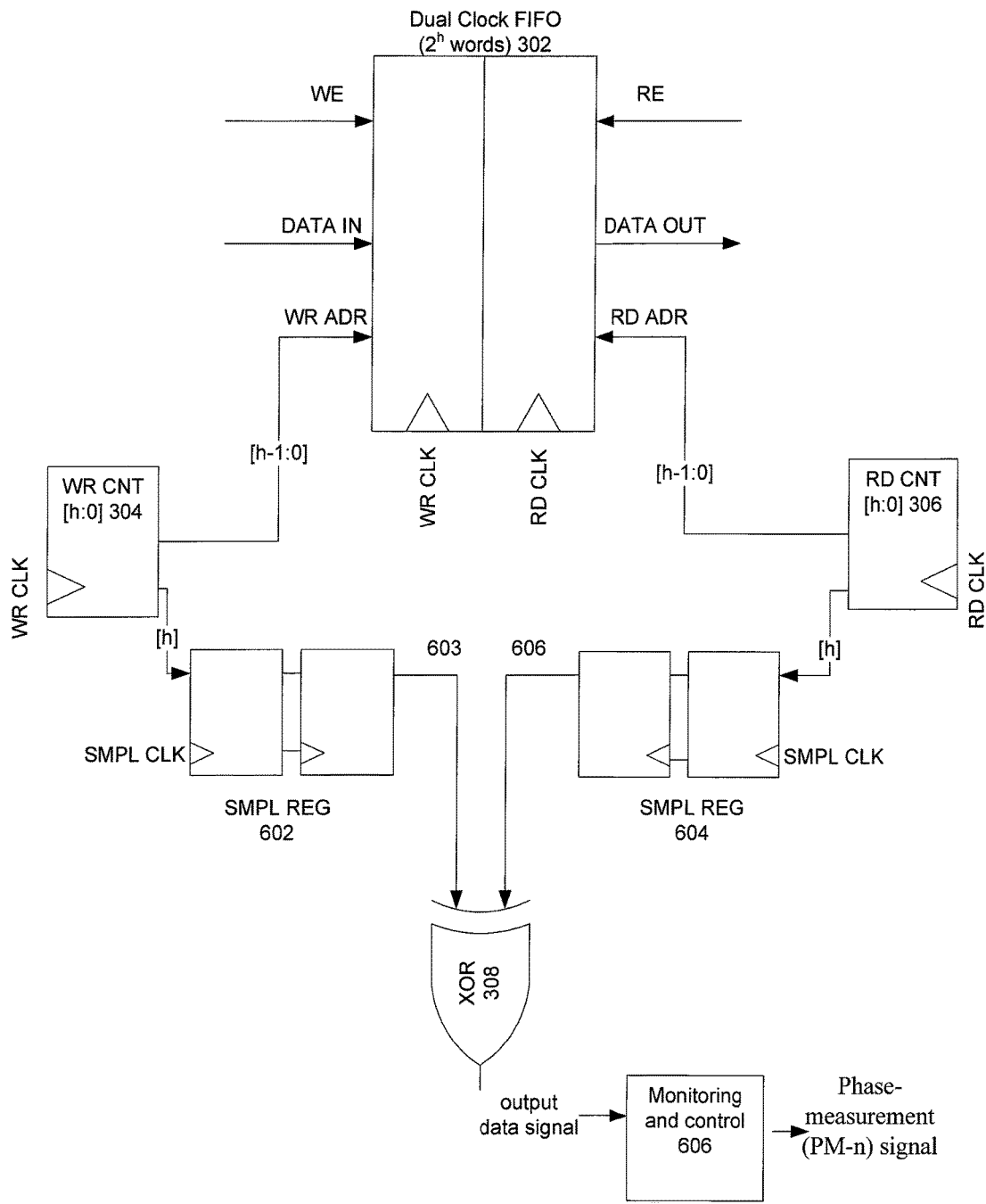
FIG. 6 is a diagram of a second exemplary phase-measuring FIFO buffer circuit that may be used in the circuit apparatus of FIG. 1 in accordance with another embodiment of the invention.

A second embodiment of a phase-measuring FIFO buffer circuit 104-n is the phase-measuring FIFO buffer circuit 600 depicted in FIG. 6. The circuit 600 in FIG. 6 is similar to the circuit 200 of FIG. 2 with the addition of a sampling register (602 and 604) between each counter and the XOR logic gate 308 and monitoring and control logic 606. In particular, a first sampling register (SMPL REG 602) is arranged between the write counter (WR CNT 304) and the XOR logic gate 308, and a second sampling register (SMPL REG 604) is arranged between the read counter (RD CNT 306) and the XOR logic gate 308. The monitoring and control logic 606 may receive the output data signal from the XOR logic gate 308.

The first and second sampling registers (602 and 604) are preferably meta-stable hardened sampling registers. For example, each sampling register may be made using a pair of flip-flops in series, as depicted in FIG. 6.

The first sampling register 602 may sample the highest-order bit (bit h) from the write counter 304 to generate a first sampled signal 503. The first sampled signal 503 may be output from the first sampling register 602 to the first input of the XOR logic gate 308. Similarly, the second sampling register 604 may sample the highest-order bit (bit h) from the read counter 306 to generate a second sampled signal 505. The second sampled signal 505 may be output from the second sampling register 604 to the second input of the XOR logic gate 308.

The XOR logic gate 308 may output a digital output signal to monitoring and control logic 606. The monitoring and control logic 606 may controllably vary the phase of SMPL CLK such that the phase is swept across a predetermined range of phases. The monitoring and control logic 606 may process the resultant output signals to determine an average occupancy level of the FIFO buffer 302. In one implementation, the monitoring and control logic 606 may be implemented by electronically-programmed circuitry (for example, in a core of a field programmable gate array). In another implementation, the monitoring and control logic 606 may be implemented using hard-wired circuitry.

Because the highest-order bits are sampled before being input to the XOR logic gate 308, the delays to the XOR logic gate 308 do not need to be matched (or to have an accurately known mismatch or skew). Instead, it is merely necessary to match (or to accurately know the mismatch of) the delays from each counter (304 and 306) to the respective sampling register (602 and 604, respectively). In addition, the sampling clock (SMPL CLK) is preferably balanced (delay matched to the sampling registers 602 and 604). Such delay matching may generally be accomplished with standard place-and-route technology.

Figure 7:
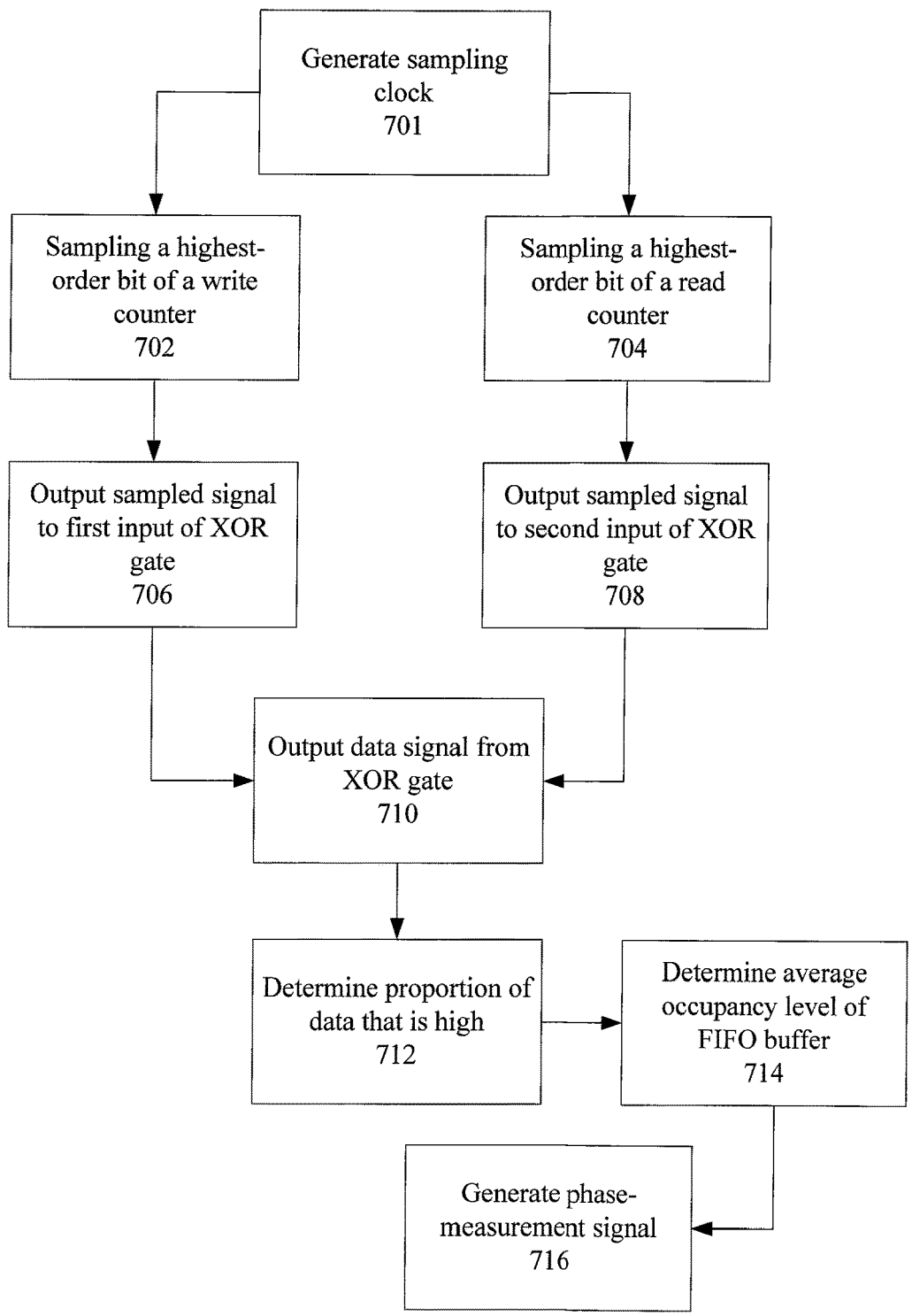
FIG. 7 is a flow chart of a method for measuring an occupancy level of a FIFO buffer using the second exemplary phase-measuring FIFO buffer circuit in accordance with an embodiment of the invention.

FIG. 7 is a flow chart of a method 700 for measuring an occupancy level of a FIFO buffer using the exemplary circuit of FIG. 6 in accordance with an embodiment of the invention. This method 700 advantageously uses the sampling registers of FIG. 6

Per block 701, a sampling clock signal may be generated by a phase-locked loop. The sampling clock signal has a frequency that is different from that of the write and read clock signals of the FIFO buffer. In one embodiment, the sampling clock signal may be selected to have a small greatest common divisor relative to the write and read clocks. This allows the sampling registers to obtain a well-distributed sampling of the highest-order write and read bit signals.

Per block 702, a first sampling register samples the highest-order bit from the read counter ("the highest-order read bit) using a sampling clock signal. Per block 704, a second sampling register samples the highest-order bit from the write counter ("the highest-order write bit") using the sampling clock signal. Blocks 702 and 704 are performed in parallel (i.e. at a same time), and the sampling clock signal is preferably delay matched to the first and second sampling registers. In addition, the first and second sampling registers may be implemented as meta-stable hardened registers.

Per block 706, the sampled signal obtained by the first sampling register ("the first sampled signal") may be output from the first sampling register to the first input of the XOR gate. Per block 708, the sampled signal obtained by the second sampling register ("the second sampled signal") may be output from the second sampling register to the second input of the XOR gate. Blocks 706 and 708 may be performed in parallel (i.e. at a same time).

Subsequently, per block 710, the XOR gate may output a data signal that is the result of applying an exclusive-or logic operation to the first and second inputs. If the first and second sampled signals are both high or both low, then the output data signal will be low. Otherwise, if one of the sampled signals is high and the other is low, then the output data signal will be high.

Per block 712, the output data signal may be processed by monitoring and control logic to determine the proportion of the output data signal that is high (versus low). Per block 714, the average occupancy of the FIFO buffer may be determined from the proportion of the output data signal that is high (versus low). For example, if the output data signal is 55% high and 45% low, then the average occupancy of the FIFO buffer may be determined to be 55% of the depth of the FIFO buffer. For instance, if the FIFO depth is eight words, then the average occupancy may be determined to be 8 words×55%=4.4 words.

Finally, per block 716, the monitoring and control logic may generate a phase-measurement (PM-n) signal based on and indicative of the measured occupancy level. In an exemplary implementation, the phase-measurement signals PM-n from all the phase-measurement FIFO circuits 104-$n$ are provided to the channel bonding control circuit 120.

It is noted that while the two embodiments described above in relation to FIGS. 3-7 use of an XOR logic gate 308, an alternate embodiment may use an XNOR (exclusive-nor) logic gate in place of the XOR logic gate 308. In such an alternate embodiment, an inverter may be provided at the output of the XNOR logic gate, or the monitoring and control logic 312 may be appropriately reversed so that the same overall functionalities are provided.

More generally, input-comparison logic may be used in place of the XOR logic gate 308, where the input-comparison logic distinguishes between the highest-order write and read bits having a same logic level and the highest-order write and read bits having different logic levels. As discussed above, the input-comparison logic may be implemented using an XOR logic gate 308 or using an XNOR logic gate.

Example of Operation

As an example of the operation of an embodiment of the invention, consider the circuit apparatus 100 of FIG. 1 with the phase-measuring FIFOs implemented as described above in relation to FIGS. 6 and 7. In this example, consider that there are three lanes (N=3), and that the FIFO physical depth is 8 words, such that h=3 and the write counters 304 and read counters 306 have h+1 bits=4 bits each. Further in this example, each word may be 40 bits, and the serializer may output 40 bits per parallel cycle. In this example, each FIFO may be sampled 8×40=320 times, and the fraction of samples that is logical one indicates the fractional occupancy of the FIFO.

In this specific example, the following sampling data is obtained: 80 of the 320 samples from the FIFO of Lane 1 are logical ones; 88 of the 320 samples from the FIFO of Lane 2 are logical ones; and 125 of the 320 samples from the FIFO of Lane 3 are logical ones. With this data, the occupancy level of the Lane 1 FIFO is 80/320×8 words=80/40 words (which corresponds to 80/40=2 parallel cycles); the occupancy level of the Lane 2 FIFO is 88/320×8 words=88/40 words (which corresponds to 88/40=2.2 parallel cycles); and the occupancy level of the Lane 3 FIFO is 125/320×8 words=125/40 words (which corresponds to 125/40=3.125 parallel cycles).

The maximum occupancy level is the occupancy level of the Lane 3 FIFO, so the maximum occupancy level is 125/40 words. The occupancy difference for the Lane 1 FIFO is 125/40 words−80/40 words=45/40 words (which corresponds to 45/40 parallel cycles). The occupancy difference for the Lane 2 FIFO is 125/40 words−88/40 words=37/40 words (which corresponds to 37/40 parallel cycles). The occupancy difference for the Lane 3 FIFO is 125/40 words−125/40 words=0 words (which corresponds to 0 parallel cycles).

Since the occupancy difference for Lane 1 is greater than one word, the BR-1 control signal is set to delay by one parallel cycle, and the TBS-1 control signal is set to slip 45−40=5 bits. Since the occupancy difference for Lane 2 is less than one word, the BR-2 control signal is set to delay by zero parallel cycles, and the TBS-2 control signal is set to slip 37 bits. Finally, since Lane 3 has the maximum occupancy, the BR-3 control signal is set to delay by zero parallel cycles, and the TBS-3 control signal is set to slip zero bits.

Alternate Embodiments

Figure 8:
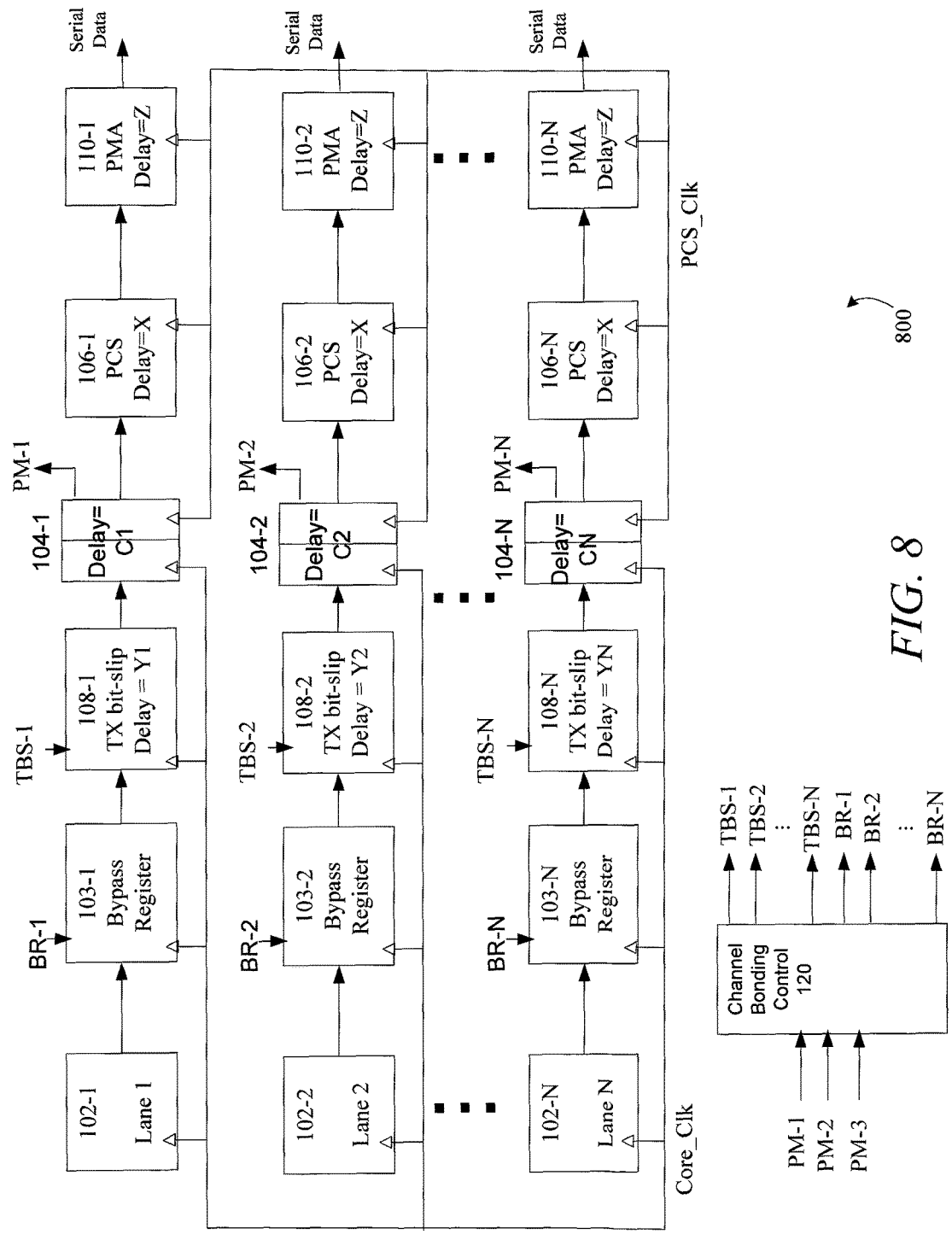
FIG. 8 is a schematic diagram of a circuit apparatus for low-skew channel bonding in accordance with a first alternate embodiment of the present invention.

FIG. 8 is a schematic diagram of a circuit apparatus 800 for low-skew channel bonding in accordance with a first alternate embodiment of the present invention. In this embodiment, the TX bit-slip circuits 108-$n$ are located before the corresponding phase-measurement FIFOs 104-$n$ in each lane n (n=1, 2, . . . , N).

Note that, as in the circuit apparatus 100 in FIG. 1, the adjustable delay Yn for each lane n is a combination of the parallel cycle delay from the bypass register 103-$n$ and the TX bit-slip circuit 108-$n$ for that lane.

In this embodiment, the Core_Clk clock signal is provided to the core registers 102-$n$, the bypass registers 103-$n$, the TX bit-slip delay circuits 108-$n$, and the phase-measuring FIFO buffers 104-$n$, while the PCS_Clk clock signal is provided to the phase-measuring FIFO buffers 104-$n$, the PCS circuits 106-$n$, and the PMA circuits 110-$n$.

Figure 9:
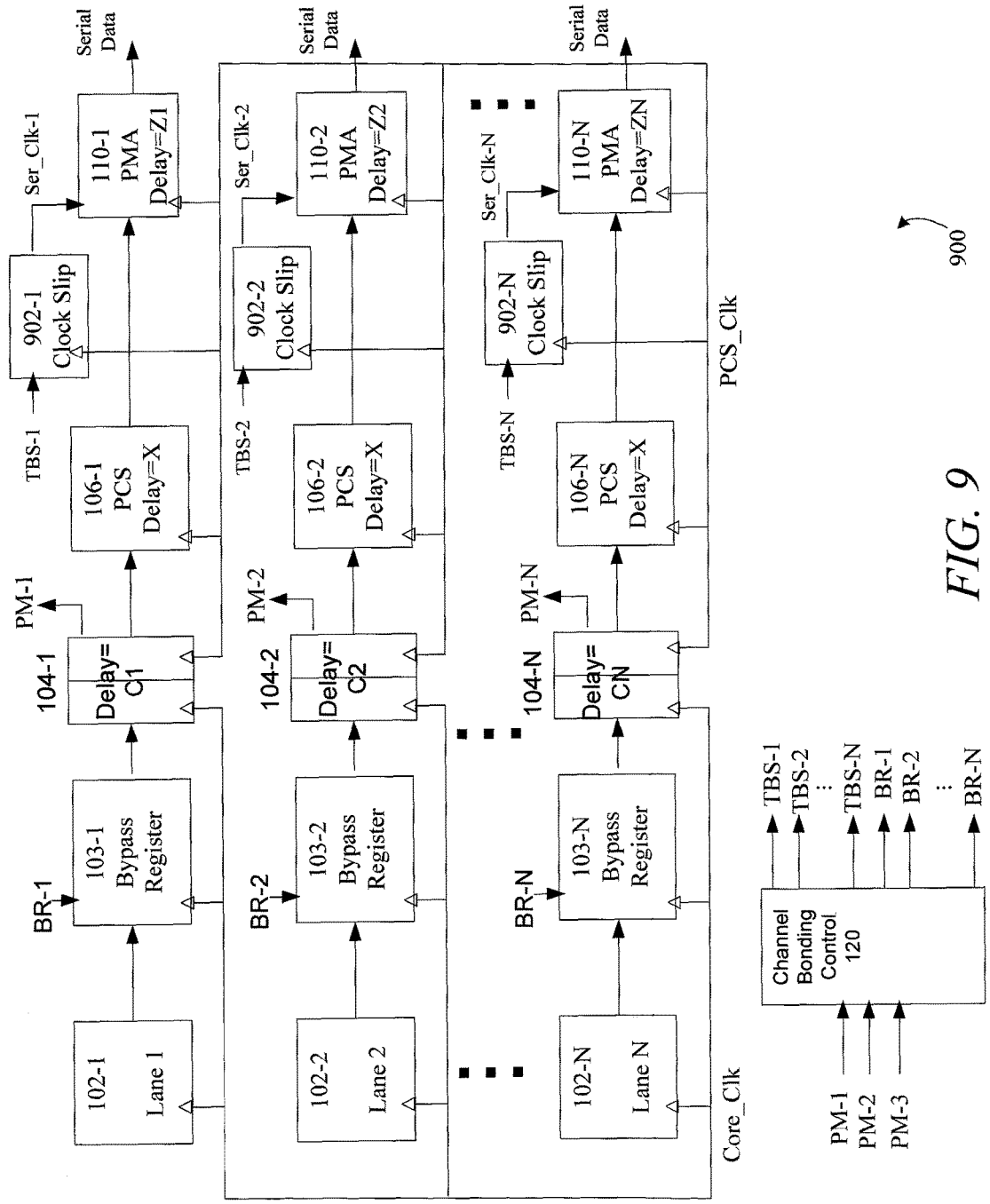
FIG. 9 is a schematic diagram of a circuit apparatus for low-skew channel bonding in accordance with a second alternate embodiment of the present invention.

FIG. 9 is a schematic diagram of a circuit apparatus 900 for low-skew channel bonding in accordance with a second alternate embodiment of the present invention. In this embodiment, instead of implementing the bit slipping in lane n by TX bit-slip circuit 108-$n$ in step 208 of FIG. 2A, the bit slipping is effectively implemented by clock slip circuit 902-$n$ that controllably slips the parallel clock signal by an integer number of unit intervals of the serial clock signal, and provides the slipped clock signal (Ser_Clk-n) to the clock input of the PMA circuit 110-$n$ (n=1, 2, . . . , N).

In this embodiment, the PMA circuit 110-$n$ combined with the bypass register 103-$n$ for lane n may be used to adjust the propagation delay from the output of the core register 102-$n$ to the output of the PMA circuit 110-$n$ for that lane. The combined delay Zn is adjusted using the bypass register (BR-n) control signal and the TX bit-slip (TBS-n)

control signal. In this case, the TX bit-slip control signals may be referred to as clock-slip control signals.

In this embodiment, the Core_Clk clock signal is provided to the core registers 102-n, the bypass registers 103-n, and the phase-measuring FIFO buffers 104-n, while the PCS_Clk clock signal is provided to the phase-measuring FIFO buffers 104-n, the PCS circuits 106-n, the clock slip circuits 902-n, and the PMA circuits 110-n.

Figure 10A:
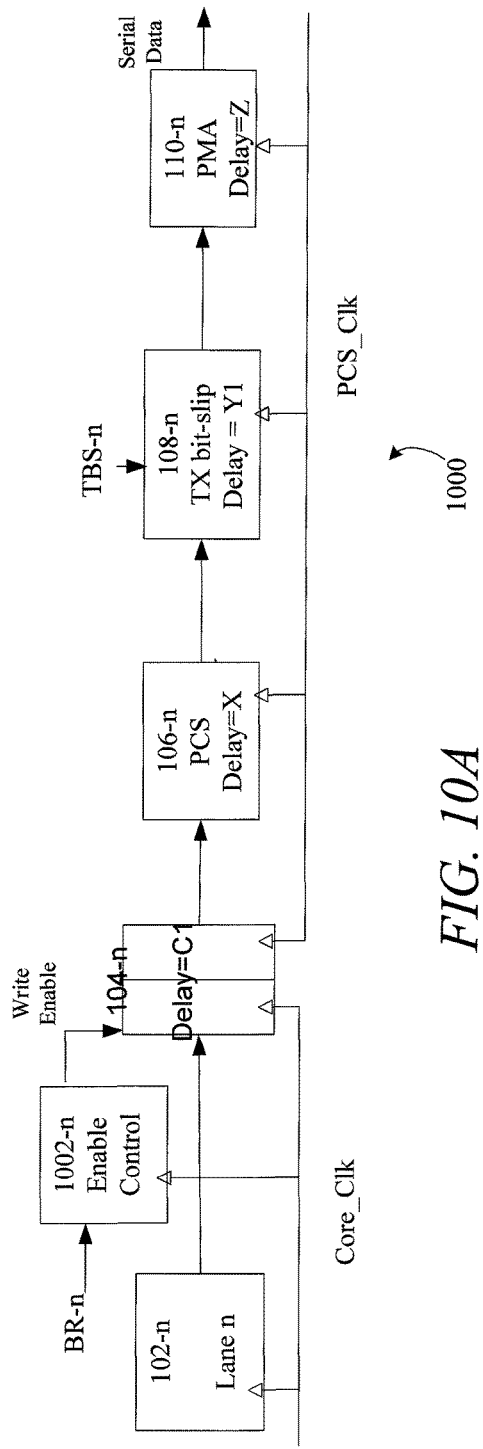
FIG. 10A is a schematic diagram of a circuit apparatus for low-skew channel bonding in accordance with a third alternate embodiment of the present invention.

FIG. 10A is a schematic diagram of a circuit apparatus 1000 for low-skew channel bonding in accordance with a third alternate embodiment of the present invention. Shown in FIG. 10A is the circuitry for one lane n, but it is to be understood that this embodiment includes circuitry for N lanes and a channel bonding control circuit 120 as in the other embodiments.

In this embodiment, instead of using bypass register 103-n to slip whole words, the write enable signal to the phase-measuring FIFO circuits 104-n are controlled by control circuit 1002-n to achieve the same result. The write enable signal is controlled to effectively adjust depth of the phase-measuring FIFO circuit 104-n so as to controllably a slip whole word (or not) depending on the BR-n signal from the channel bonding circuit 120.

Figure 10B:
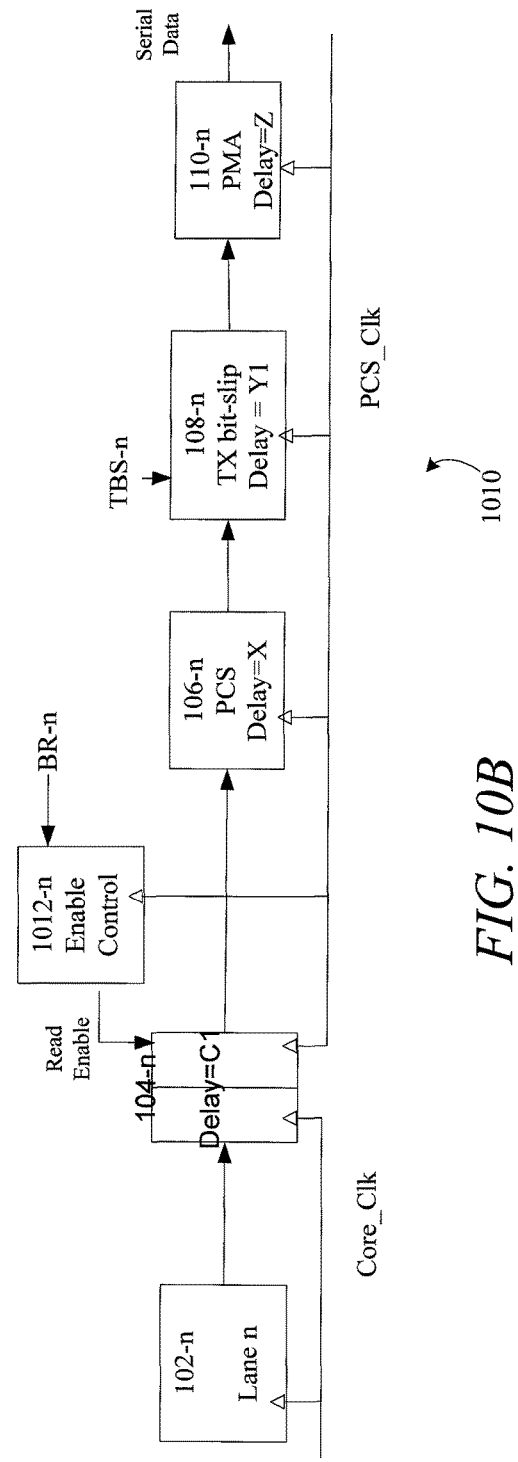
FIG. 10B is a schematic diagram of a circuit apparatus for low-skew channel bonding in accordance with a fourth alternate embodiment of the present invention.

FIG. 10B is a schematic diagram of a circuit apparatus 1000 for low-skew channel bonding in accordance with a third alternate embodiment of the present invention. Shown in FIG. 10B is the circuitry for one lane n, but it is to be understood that this embodiment includes circuitry for N lanes and a channel bonding control circuit 120 as in the other embodiments.

In this embodiment, instead of using bypass register 103-n to slip whole words, the read enable signal to the phase-measuring FIFO circuits 104-n are controlled by control circuit 1012-n to achieve the same result. The read enable signal is controlled to effectively adjust depth of the phase-measuring FIFO circuit 104-n so as to controllably a slip whole word (or not) depending on the BR-n signal from the channel bonding circuit 120.

Exemplary Integrated Circuit and Exemplary System

Figure 11:
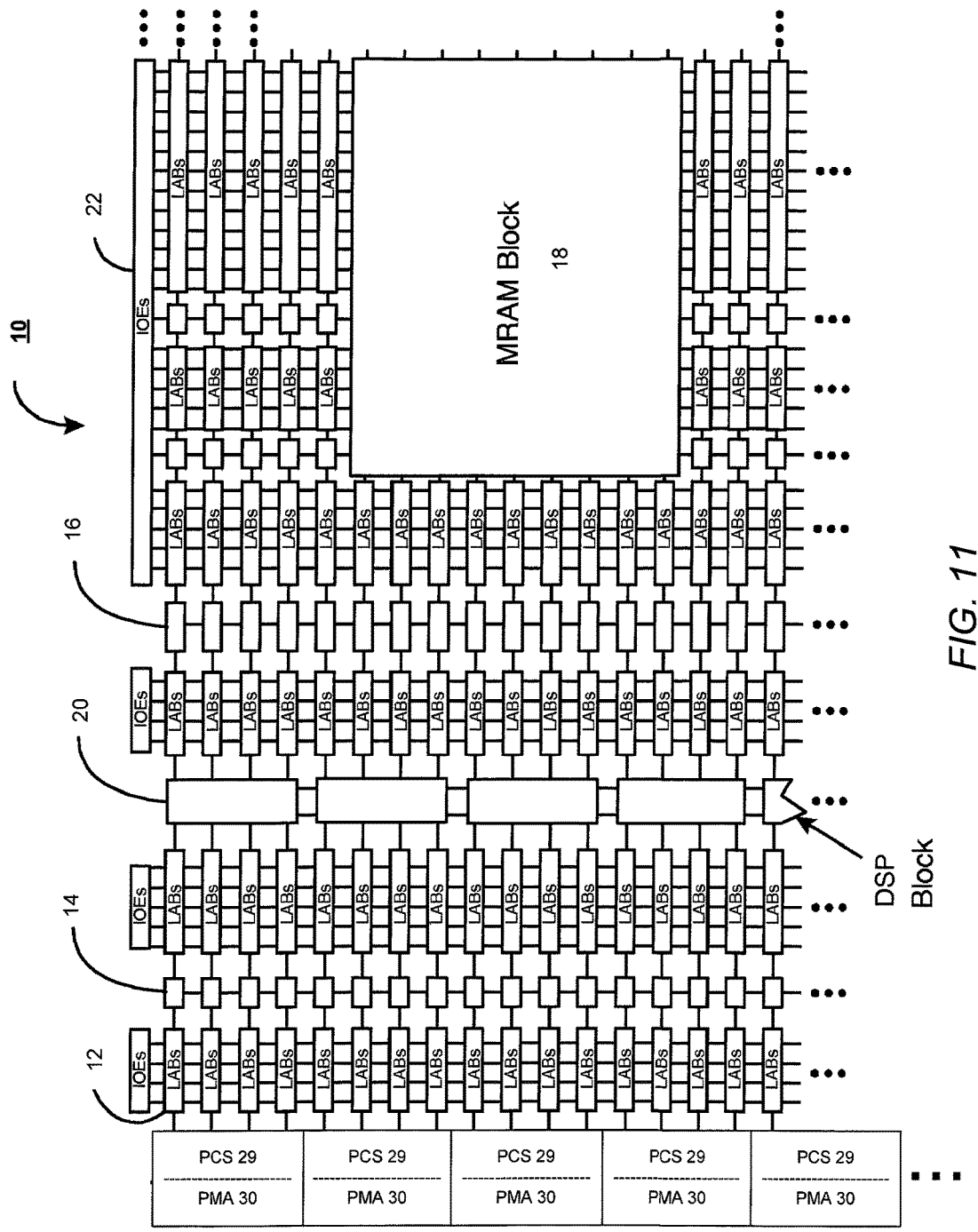
FIG. 11 is a simplified partial block diagram of an exemplary field programmable gate array (FPGA) that may be configured to implement an embodiment of the present invention.

FIG. 11 is a simplified partial block diagram of an exemplary field programmable gate array (FPGA) 10 that may be configured to implement an embodiment of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 10 includes within its "core" a two-dimensional array of programmable logic array blocks (or LABs) 12 that are interconnected by a network of column and row interconnect conductors of varying length and speed. LABs 12 include multiple (e.g., ten) logic elements (or LEs). A LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 10 may also include a distributed memory structure including random access memory (RAM) blocks of varying sizes provided throughout the array. The RAM blocks include, for example, blocks 14, blocks 16, and block 18. These memory blocks can also include shift registers and FIFO buffers.

FPGA 10 may further include digital signal processing (DSP) blocks 20 that can implement, for example, multipliers with add or subtract features. Input/output elements (IOEs) 22 located, in this example, around the periphery of the chip support numerous single-ended and differential input/output standards. Each IOE 22 is coupled to an external terminal (i.e., a pin) of FPGA 10.

Physical coding sublayer (PCS) 29 and physical medium attachment (PMA) 30 modules may be arranged as shown, for example, with each PCS module 29 being coupled to several LABs. Each PMA module 30 may be communicatively coupled to a corresponding PCS module 29 and may include analog (and digital) circuitry to implement one or more transceiver channels.

It is to be understood that FPGA 10 is described herein for illustrative purposes only and that the present invention can be implemented in many different types of PLDs, FPGAs, and ASICs.

Figure 12:
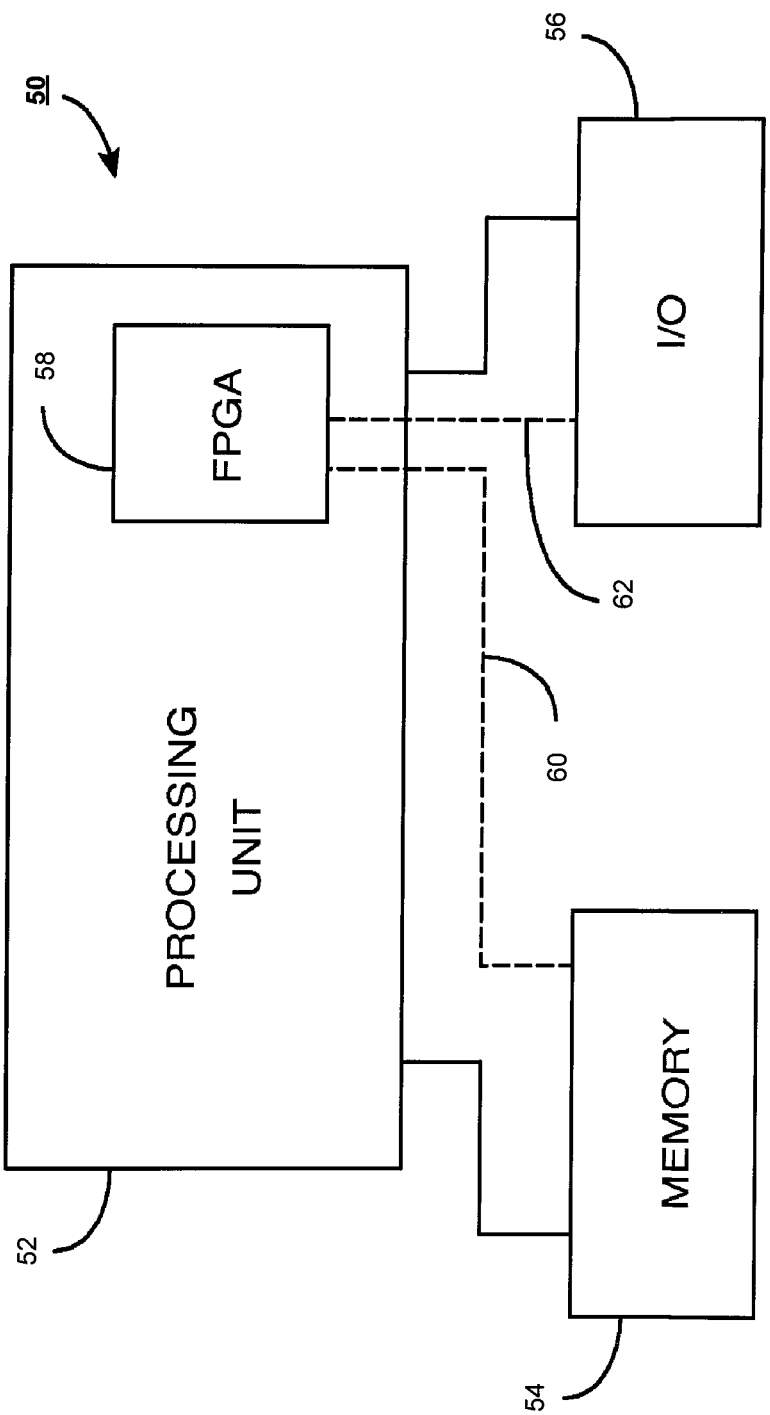
FIG. 12 shows a block diagram of an exemplary digital system that may employ apparatus and methods as disclosed herein.

FIG. 12 shows a block diagram of an exemplary digital system 50 that may employ techniques disclosed herein. System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A circuit for low-skew bonding of a plurality of data channels into a multi-lane data channel, the circuit comprising:
   a plurality of phase-measuring first-in first-out buffer circuits which buffer a plurality of pre-buffer parallel data signals, output a plurality of buffered parallel data signals, and generate a plurality of phase-measurement signals which measure phases of the plurality of pre-buffer parallel data signals and provides a plurality of occupancy levels;
   a plurality of transmission bit-slip circuits which receive a plurality of pre-slip parallel data signals and a plurality of bit-slip control signals and outputs a plurality of bit-slipped parallel data signals; and
   a channel-bonding control circuit which receives the plurality of phase-measurement signals from the plurality of phase-measuring first-in first-out buffer circuits and provides the plurality of bit-slip control signal to the plurality of transmission bit-slip circuits, and determines a maximum occupancy level from the plurality of occupancy levels, and wherein a plurality of occupancy differences are computed from differences between the maximum occupancy level and each of the plurality of occupancy levels.

2. The circuit of claim 1, wherein the plurality of transmission bit-slip circuits controllably delay the pre-slip parallel data signals by integral numbers of bits that are indicated by the plurality of bit-slip control signals received from the channel-bonding control circuit.

3. The circuit of claim 2, further comprising:
   a plurality of bypass register circuits which receive a plurality of input parallel data signals from a plurality of core registers and receive a plurality of bypass register control signals from the channel-bonding control circuit.

4. The circuit of claim 3, wherein the plurality of bypass register circuits output a plurality of conditional parallel-delayed signals, wherein a conditional parallel-cycle delayed signal output by a bypass register circuit of the plurality of bypass register circuits is delayed by a parallel cycle when the bypass register circuit receives a bypass register control signal in a first state, and wherein the conditional parallel-cycle delayed signal output by the bypass register circuit is not delayed by a parallel cycle when the bypass register circuit receives the bypass register control signal in a second state.

5. The circuit of claim 3, wherein the plurality of pre-buffer parallel data signals comprise the plurality of conditional parallel-cycle delayed signal that are output from the plurality of bypass register circuits.

6. The circuit of claim 3, wherein the plurality of pre-slip parallel data signals comprise the plurality of conditional parallel-cycle delayed signals that are output from the plurality of bypass register circuits.

7. The circuit of claim 3, further comprising:
   a plurality of encoder circuits that receive a plurality of pre-encode parallel data signals and output a plurality of encoded parallel data signals.

8. The circuit of claim 7, wherein the plurality of pre-encode parallel data signals comprise the plurality of buffered parallel data signals output from the plurality of phase-measuring first-in first-out buffer circuits, and wherein the plurality of encoded parallel data signals comprise the plurality of pre-slip parallel data signals that are input by the plurality of transmission bit-slip circuits.

9. The circuit of claim 7, further comprising:
   a plurality of serializer circuits that output a plurality of serial data signals of the multi-lane data channel, wherein the plurality of pre-encode parallel data signals comprise the plurality of buffered parallel data signals output from the plurality of phase-measuring first-in first-out buffer circuits, and wherein the plurality of encoded parallel data signals input by the plurality of serializer circuits.

10. The circuit of claim 2, wherein each phase-measuring FIFO circuit of the plurality of phase-measuring FIFO circuits receives read and write enable signals, and wherein at least one of said enable signals are controlled to adjust a depth of the phase-measuring FIFO circuit.

11. The circuit of claim 1, wherein a plurality of bit slip numbers are computed from the plurality of occupancy differences.

12. The circuit of claim 11, wherein a bit slip number is reduced by a width of a parallel data signal when the bit slip number is greater than the width of the parallel data signal.

13. A method of low-skew bonding of a plurality of data channels into a multi-lane data channel, the method comprising:
   buffering a plurality of pre-buffer parallel data signals by a plurality of phase-measuring first-in first-out buffer circuits;
   outputting a plurality of buffered parallel data signals by the plurality of phase-measuring first-in first-out buffer circuits;
   generating a plurality of phase-measurement signals by the plurality of phase-measuring first-in first-out buffer circuits, wherein the plurality of phase-measurement signals measure phases of the plurality of pre-buffer parallel data signals;
   receiving a plurality of pre-slip parallel data signals and a plurality of bit-slip control signals by a plurality of transmission bit-slip circuits;
   outputting a plurality of bit-slipped parallel data signals by the plurality of transmission bit-slip circuits;
   receiving the plurality of phase-measurement signals by a channel-bonding control circuit; and
   providing the plurality of bit-slip control signal from the channel-bonding control circuit to the plurality of transmission bit-slip circuits.

14. The method of claim 13, further comprising:
   delaying the plurality of pre-slip parallel data signals by integral numbers of bits that are indicated by the plurality of bit-slip control signals received by the plurality of transmission bit-slip circuits from the channel-bonding control circuit.

15. The method of claim 14, further comprising:
   receiving a plurality of input parallel data signals by a plurality of bypass register circuits;

receiving a plurality of bypass register control signals by the plurality of bypass register circuits from the channel-bonding control circuit; and outputting a plurality of conditional parallel-delayed signals from the plurality of bypass register circuits.

16. The method of claim 15, further comprising:

delaying a conditional parallel-cycle delayed signal output by a bypass register circuit by a parallel cycle when the bypass register circuit receives a bypass register control signal in a first state, and not delaying the conditional parallel-cycle delayed signal output by the bypass register circuit by the parallel cycle when the bypass register circuit receives the bypass register control signal in a second state.

17. The method of claim 13, wherein the plurality of phase-measurement signals provides a plurality of occupancy levels, further comprising:

determining a maximum occupancy level from the plurality of occupancy levels by the channel-bonding control circuit;

computing a plurality of occupancy differences from differences between the maximum occupancy level and each of the plurality of occupancy levels; and computing a plurality of bit slip numbers from the plurality of occupancy differences; and reducing a bit slip number by a width of a parallel data signal when the bit slip number is greater than the width of the parallel data signal.

18. A circuit for low-skew bonding of a plurality of data channels into a multi-lane data channel, the circuit comprising:

a plurality of phase-measuring first-in first-out buffer circuits which buffer a plurality of parallel data signals and generate a plurality of phase-measurement signals which measure phases of the plurality of parallel data signals;

a channel-bonding control circuit which receives the plurality of phase-measurement signals from the plurality of phase-measuring first-in first-out buffer circuits and outputs a plurality of clock-slip control signals; and a plurality of clock slip circuits that generate a plurality of slipped clock signals by controllably slipping a plurality of parallel clock signals by integer numbers of unit intervals of a serial clock signal, wherein the integer numbers of unit intervals are determined from the plurality of clock-slip control signals.

19. A method of low-skew bonding of a plurality of data channels into a multi-lane data channel, the method comprising:

buffering a plurality of parallel data signals by a plurality of phase-measuring first-in first-out buffer circuits;

outputting a plurality of phase-measurement signals by the plurality of phase-measuring first-in first-out buffer circuits, wherein the plurality of phase-measurement signals measure phases of the plurality of parallel data signals;

receiving the plurality of phase-measurement signals by a channel-bonding control circuit from the plurality of phase-measuring first-in first-out buffer circuits;

outputting a plurality of clock-slip control signals by the channel-bonding control circuit; and generating a plurality of slipped clock signals by controllably slipping a plurality of parallel clock signals by integer numbers of unit intervals of a serial clock signal, wherein the integer numbers of unit intervals are determined from the plurality of clock-slip control signals.

* * * * *